United States Patent [19]

Voyce

[11] Patent Number: 5,757,311
[45] Date of Patent: May 26, 1998

[54] DELAYED FREQUENCY SWEEP FOR FMCW RADAR

[75] Inventor: Kenneth G. Voyce, Bellevue, Wash.

[73] Assignee: The Boeing Company, Seattle, Wash.

[21] Appl. No.: 530,808

[22] Filed: Sep. 20, 1995

[51] Int. Cl.⁶ .................................................. G01S 13/32
[52] U.S. Cl. ........................ 342/130; 342/128; 342/200
[58] Field of Search .......................... 342/128, 200, 342/129, 130; 367/101, 102

[56] References Cited

U.S. PATENT DOCUMENTS

| | | | |
|---|---|---|---|
| 3,256,520 | 6/1966 | Blitz | 342/128 |
| 3,605,094 | 9/1971 | Peperone | 342/128 |
| 3,710,387 | 1/1973 | Hinchman et al. | 342/128 |
| 3,789,398 | 1/1974 | Erst | 342/128 |
| 4,044,356 | 8/1977 | Fournier | 342/128 |
| 4,205,316 | 5/1980 | Peperone | 342/129 |
| 4,389,649 | 6/1983 | Parkhurst et al. | 342/189 |
| 4,647,873 | 3/1987 | Beckner et al. | 331/4 |
| 4,754,277 | 6/1988 | Voyce | 342/83 |
| 4,783,632 | 11/1988 | Crookshanks | 342/201 |
| 4,912,472 | 3/1990 | Reits | 342/128 |
| 5,028,886 | 7/1991 | Seibel et al. | 331/4 |
| 5,210,539 | 5/1993 | Voyce | 342/83 |
| 5,381,153 | 1/1995 | Saito et al. | 342/70 |
| 5,432,516 | 7/1995 | Cherry et al. | 342/28 |

*Primary Examiner*—Ian J. Lobo
*Attorney, Agent, or Firm*—Conrad O. Gardner

[57] ABSTRACT

In a Frequency Modulated Continuous Wave (FMCW) radar, a radar return signal is mixed with a delayed frequency sweep waveform to gain a ranging signal to noise ratio (RSNR) higher than the RSNR available from mixing the return signal with a transmitted waveform.

1 Claim, 5 Drawing Sheets

DELAYED FREQUENCY SWEEP FOR FMCW RADAR

This invention was made with Government support under Contract No. F33615-92-D-5812 awarded by the United States Air Force. The Government has certain rights in this invention.

FIELD OF THE INVENTION

The present invention relates to FMCW (frequency modulation continuous wave) radars and more particularly to an FMCW radar exhibiting long range capability.

BACKGROUND OF THE INVENTION

The transmit signal from a typical FMCW radar is modulated to form as frequency sweep or ramp. This frequency sweep must be highly linear in order for the radar to achieve its expected range resolution. The technology of linear frequency sweep generation has evolved from techniques that utilized coaxial delay lines (Reference 1) to techniques that use frequency synthesizers, both direct digital DDS. and phaselock loop, PLL (Reference 2).

An FMCW radar that must exhibit long range capability is faced with an additional problem. The delay from transmit to receive (for targets at the maximum range) can be a significant percentage of the transmit repetition interval. This means that the transmit signal and the receive signal may overlap for only a small portion of the interval. But the detection efficiency of the receiver depends on this overlap, because the two signals are compared only while they are overlapping. To efficiently detect the return signal, the overlap must be at least 80% of the transmit interval.

Extending the radar range would seem to be a simple matter of extending the repetition interval to achieve a larger percentage overlap, but further constrain, such as information rate, disallow this.

SUMMARY OF THE INVENTION

In the preferred embodiment of the present system a Frequency Modulated Continuous Wave (FMCW) radar, a radar return signal is mixed with a delayed frequency sweep waveform to gain a ranging signal to noise ratio (RSNR) higher than the RSNR available from mixing the return signal with a transmitted waveform as in prior systems. The transmitted waveform is generated by a first linear frequency sweep generator (LFSG), being an improved version of the LFSG, described in U.S. Pat. No. 5,210,539 assigned to The Boeing Company. A second LFSG, being as described in U.S. Pat. No. 5,210,539, produces a second waveform which has its frequency offset by a constant difference frequency from the transmitted waveform frequency. A time-series of frequency correction signals for the second LFSG, which causes its frequency nonlinearities to match those of the first LFSG, is stored in a digital memory during intermittent calibration cycles. During ranging operations, the second LFSG is triggered at a delay time after the first LFSG is triggered. The frequency sweep of the second LFSG is linearized by both the feedback loop and by said time-series read sequentially from the digital memory. The delay time and the constant difference frequency are chosen to best improve RSNR and to avoid ranging ambiguities, respectively.

DETAILED DESCRIPTION OF THE INVENTION

PROBLEMS SOLVED BY THE INVENTION

A method of achieving a high percentage overlap is to generate a delayed version of the transmit signal. The delay would be adjusted so that the new signal has a high percentage overlap with the received signal. This delayed transmit signal would then be used in place of the original transmit signal, as the local oscillator, (L.O.) for comparison to the received signal. (See FIG. 1) The problem, therefore, is to find a suitable method of delaying the transmit signal.

An additional problem is that the imperfections (frequency sweep nonlinearities) of both the original transmit signal and the delayed version of the transmit signal (L.O.) must be closely matched. In other words, the two signals must be highly correlated at zero delay.

PRESENT SYSTEM

Figure 1:
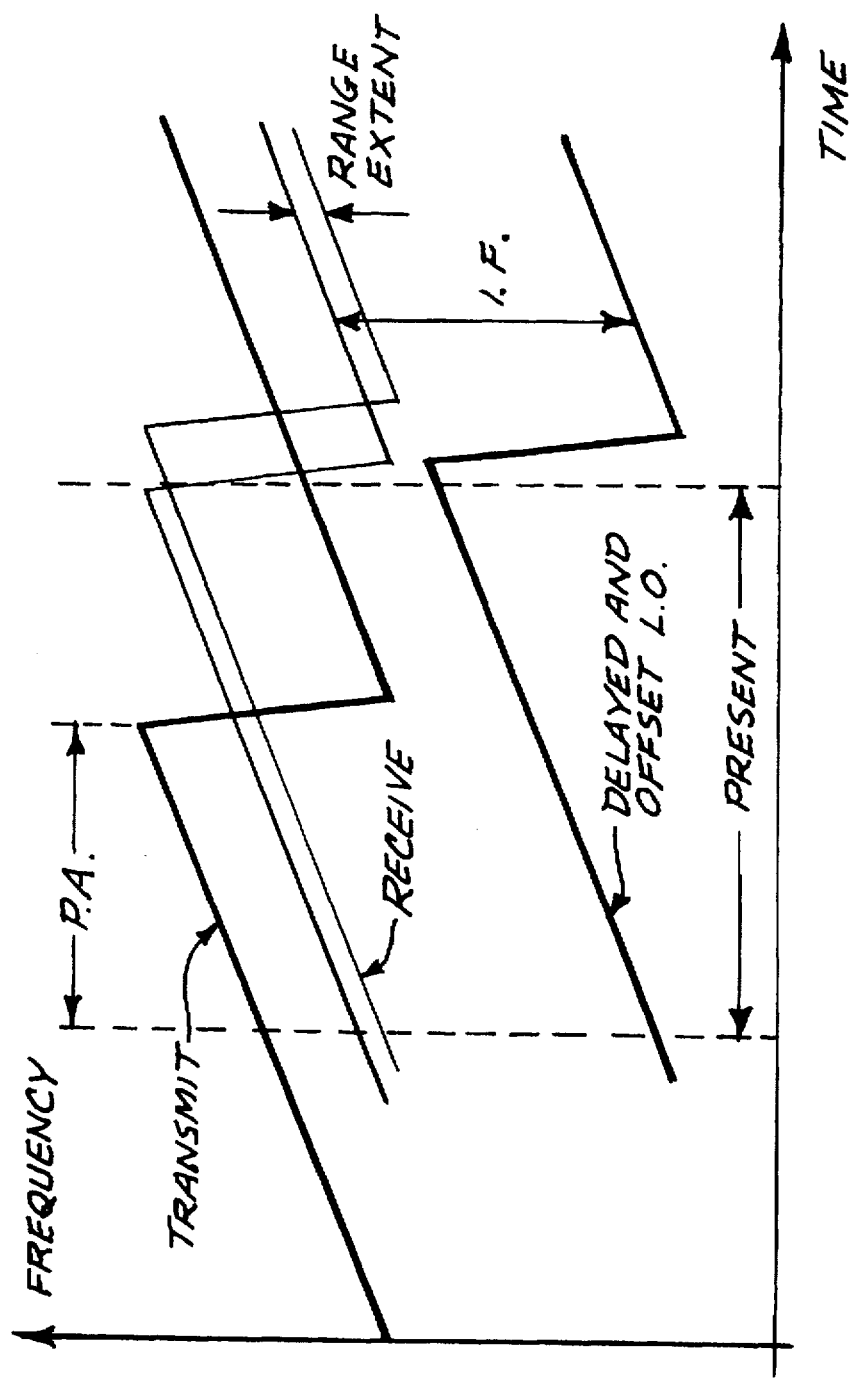
FIG. 1 is a graph showing transmit, receive and L.O. (local oscillator) signals with time illustrative of the method of achieving high overlap in accordance with a preferred embodiment of the present invention.

The RECEIVE signal and the LO signal can be compared (electronically) only during the period where both are ramping up. In the present system hereinafter described, this is the period referred to as the overlap. Prior art has resorted to using the signal labeled "TRANSMIT" as the LO. FIG. 1 shows that there is little overlap between this signal and the RECEIVE signal. (See P.A.) But a large overlap can be achieved by generating a delayed version of the transmit signal. (See PRESENT) This delayed version is shown in the figure as DELAYED AND OFFSET LO and achieves a large overlap with the RECEIVE signal.

An example of the radar's strategy in using the delayed LO would be:. If it is decided to use the radar to look at targets at around, e.g. 1 km, the, radar controller of FIG. 2 and 3 would compute the time required for signals to return from targets at that range. The delayed LO would then be triggered, after that appropriate delay so that the LO ramp would coincide with those of the return signals.

Figure 5:
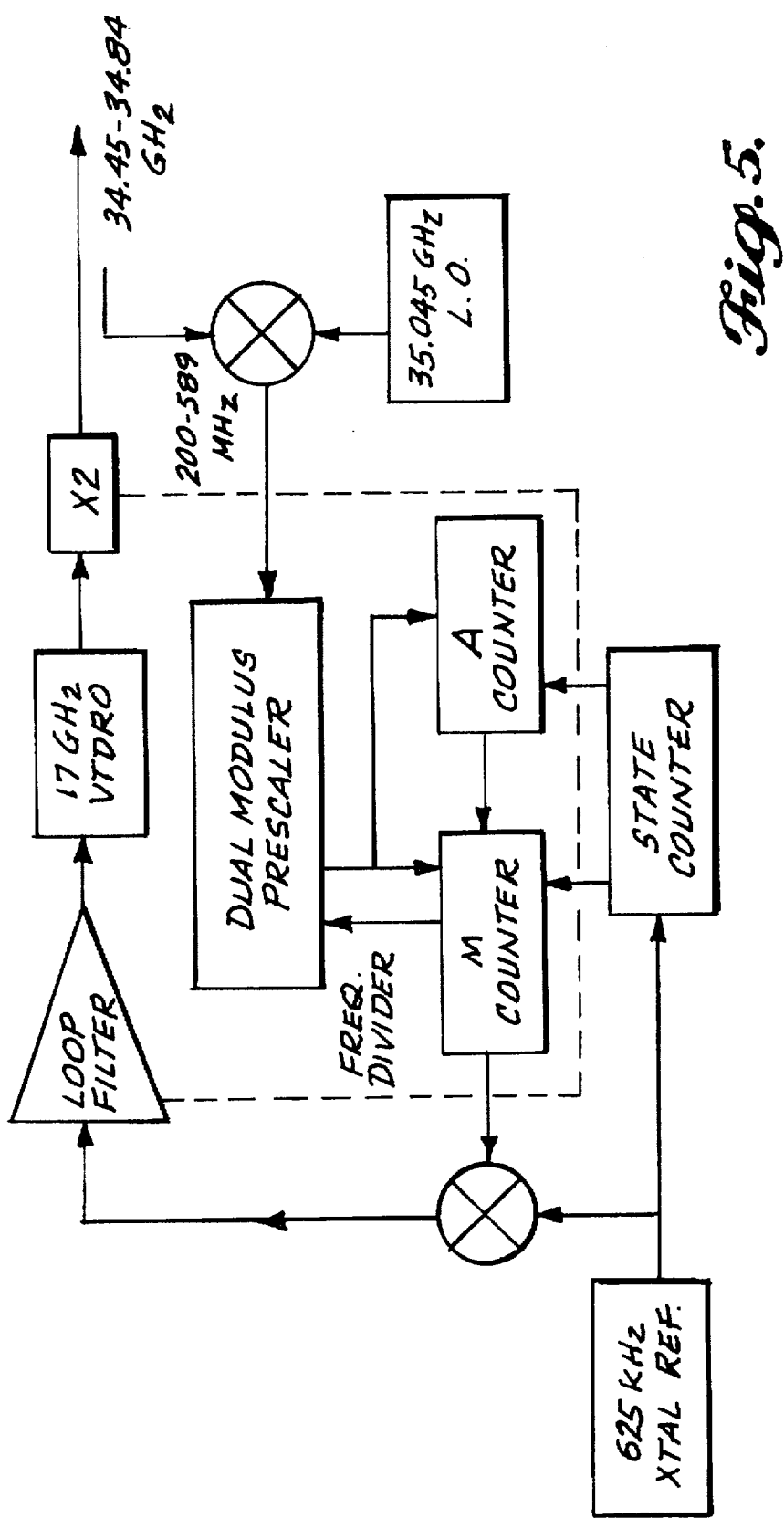

The present system utilizes two Linear Frequency Sweep Generators, LFSG (generators as described in reference 2 and FIG. 5) with the addition of circuitry that forces the imperfections to be matched. It also includes an optional fiber optic delay line which can be used to improve the performance of the basic LFSG. See FIGS. 2 and 3. Each of the two basic LFSGs, (transmit and L.O.), generate a very linear frequency sweep, but the L.O. sweep is generated after a predetermined delay so that it can overlap the received signal.

The frequency nonlinearities (imperfections) of the two sweeps are matched by comparing them during a periodic calibration cycle. The mismatch errors are detected and correction factors are derived and stored in memory. During normal operation the correction factors are continuously recalled from the memory to derive a correction signal. This signal is summed into the basic loop that generates the L.O. sweep thereby generating matching imperfections.

In addition, a frequency offset is applied to the L.O. sweep in order to avoid range ambiguities.

Figure 2:
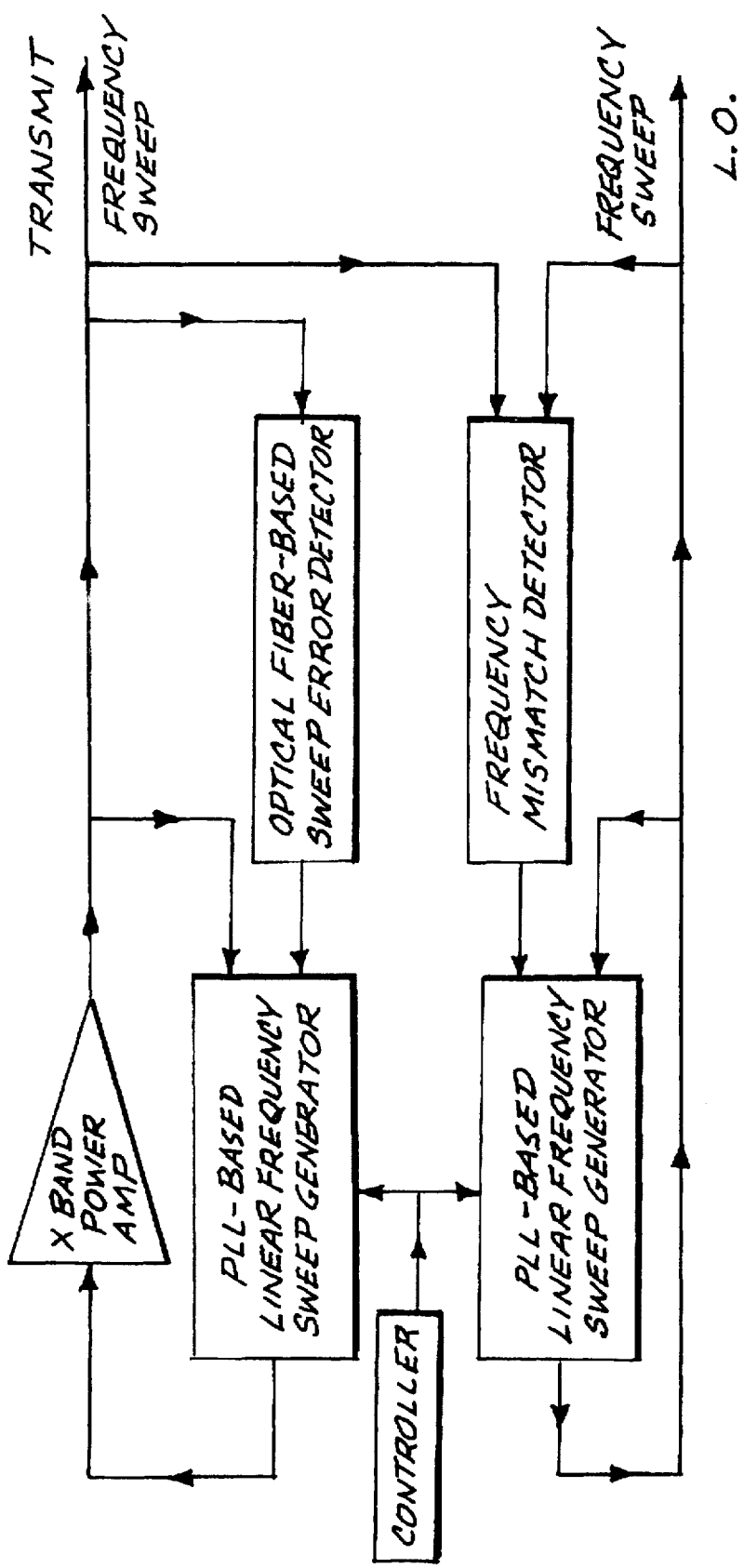
FIG. 2 is a block diagram illustrative of two linear frequency sweep generators, transmit and local oscillator as shown in reference 2 (and FIG. 5) which are utilized in the system according to the present invention.

The improvement to the performance of the prior patented LFSG circuit assigned to the Boeing Company is accomplished with the addition of the Optical Fiber-Based Sweep Error Detector shown in FIG. 2. The pair of LFSGs in FIG. 2 are configured to generate the transmit chirp and the delayed LO chirp.

In FIG. 2 the Frequency Sweep Mismatch Detector provides information to the 2nd LFSG thus allowing it to correct any mismatches.

Figure 3:
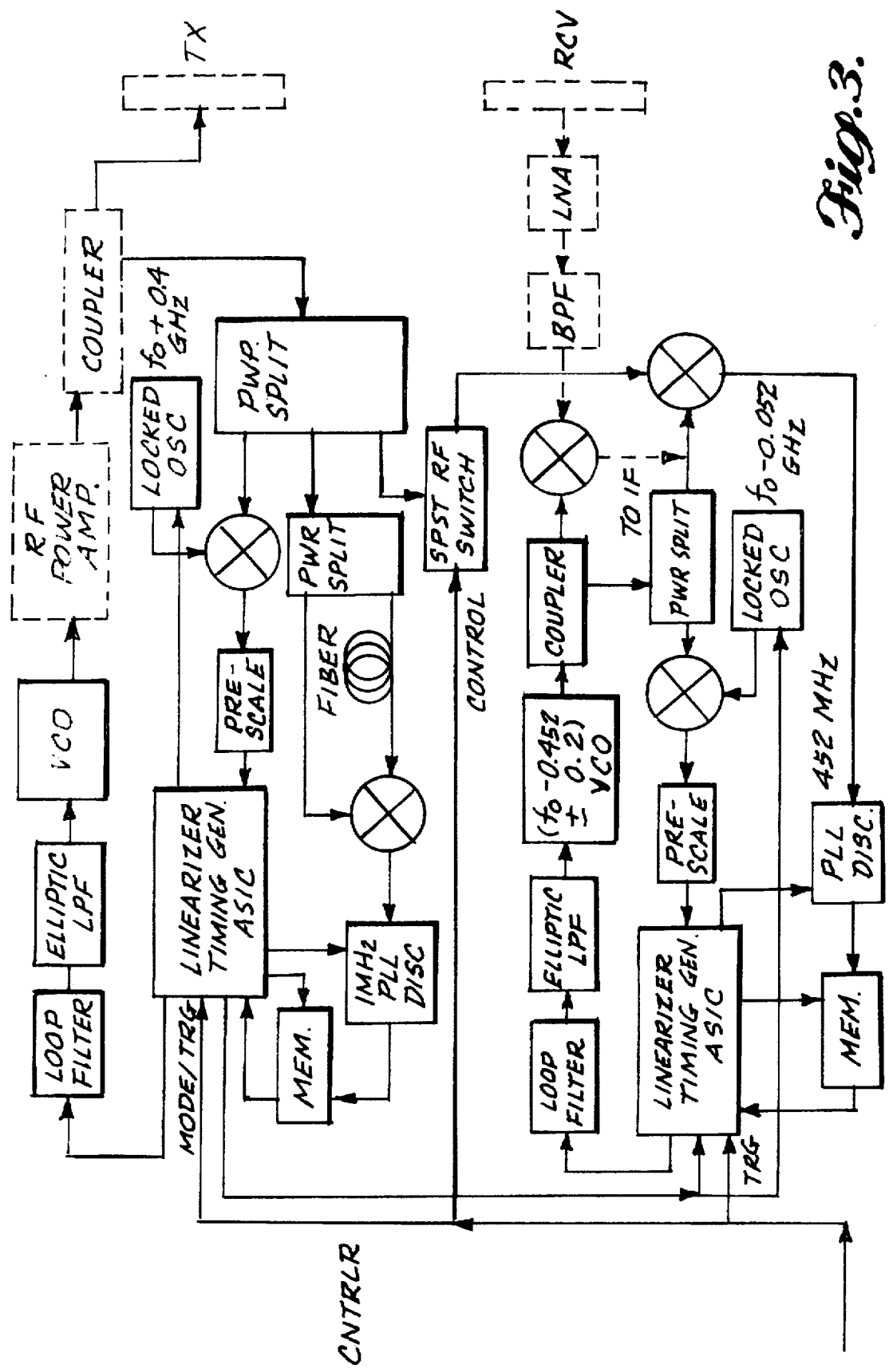
FIG. 3 is a block diagram illustrative of radar systems front end in accordance with a preferred embodiment of the present invention showing the present transmit and local oscillator linear frequency sweep generators.
Figure 4:
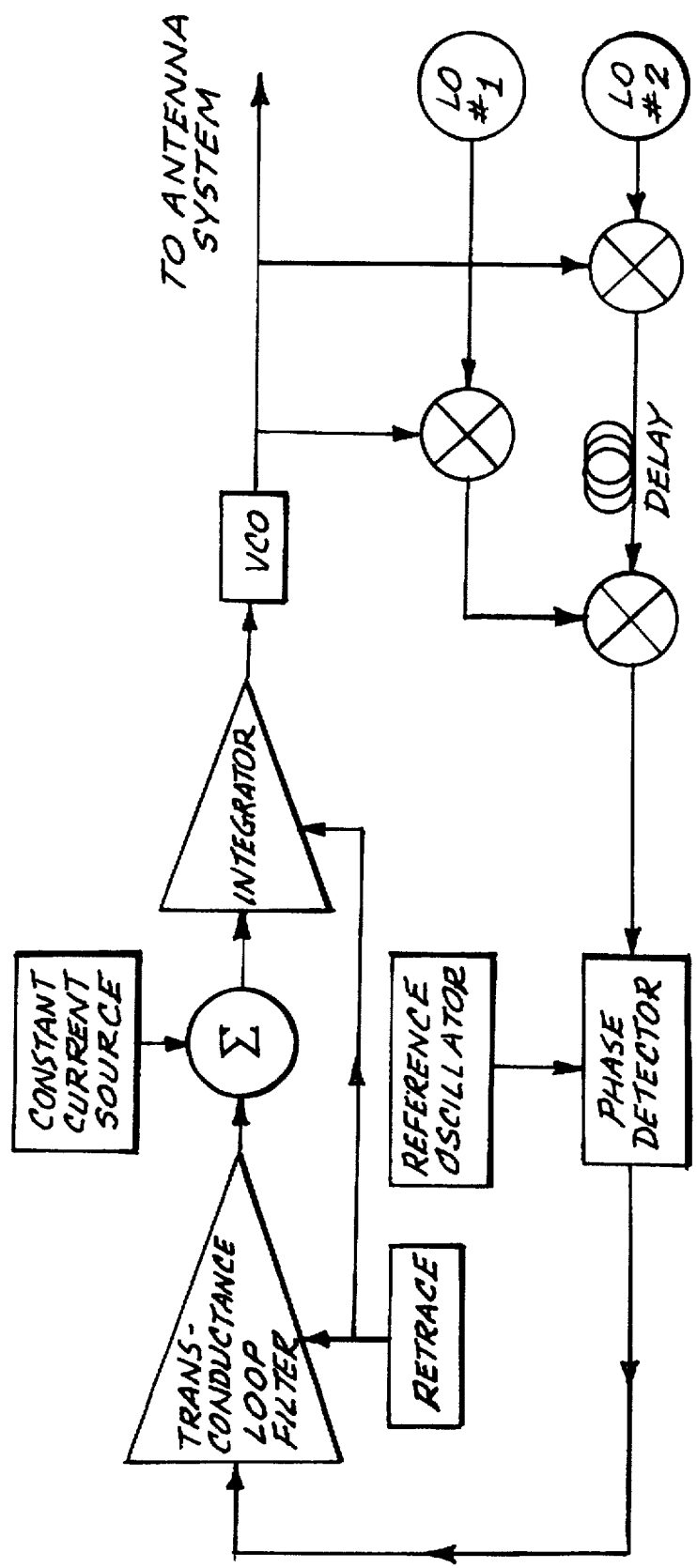
FIG. 4 is a block diagram of the linear frequency sweep generator with delay line shown in Reference 1 (U.S. Pat. No. 4,754,277); and, FIG. 5 is a block diagram of the linear frequency sweep synthesizer shown in Reference 2 (U.S. Pat. No. 5,210,539).

FIG. 3 is a detailed block diagram of the present dual LFSG circuit. Further features of the present system which will be appreciated by those skilled in the art include:

1. A system configuration for delayed frequency sweep for FMCW radar which includes two LFSGs, mismatch error detection, error memory, and error correction.
2. A system that provides an FMCW radar both long range capability and range resolution of 0.5 meter or better.
3. A method of improving sweep linearity over that produced by the frequency sweep synthesizer of reference (2).
4. A method of correcting errors in a given sweep based on a correction signal that is accumulated/improved over many sweeps.

References (Reference 1 and Reference 2)

1. Apparatus and Method for Producing Linear Frequency Sweep. U.S. Pat. No. 4,754,277, Jun. 28, 1988, Inventor:

Kenneth G. Voyce, Assignee: The Boeing Company, Invention Disclosure No. A83-159, appl Ser. No. 902,658, Filed: Sep. 2, 1986

2. Linear Frequency Sweep Synthesizer, U.S. Pat. No. 5,210,539, May 11, 1993, Inventor Kenneth G. Voyce, Assignee: The Boeing Company, Invention Disclosure No. A85-117, appl. Ser. No. 913,777, Filed Sep. 30, 1986

While the preferred embodiments of the invention have been illustrated and described, variations will be apparent to those skilled in the art. Accordingly, the invention is not to be limited to the specific embodiments illustrated and described, and the true scope of the invention is to be determined by reference to the following claims.

The embodiments of the invention in which an exclusive property or privilege is claimed are defined in the following claims, wherein I claim:

1. In combination in an FMCW radar system: a transmitted waveform generated by a first linear frequency sweep generator;

a second linear frequency sweep generator having a frequency offset by a constant difference frequency from the transmitted waveform frequency;

a time series of frequency correction signals for said second linear frequency sweep generator for matching the nonlinearities of said second linear frequency sweep generator with the nonlinearities of said first linear frequency sweep generator;

said time series of frequency correction signals for said second linear frequency sweep generator stored in a digital memory during intermittent calibration cycles;

said second linear frequency sweep generator triggered at a delay time subsequent to the triggering of said first linear frequency sweep generator; and, the frequency sweep of said second linear frequency sweep generator being linearized by the time series read sequentially from said digital memory.

* * * * *